United States Patent
Strawser

(10) Patent No.: US 11,314,855 B2
(45) Date of Patent: Apr. 26, 2022

(54) DETECTING STACK PIVOTS USING STACK ARTIFACT VERIFICATION

(71) Applicant: Webroot Inc., Broomfield, CO (US)

(72) Inventor: Ira Strawser, Thorton, CO (US)

(73) Assignee: WEBROOT INC., Broomfield, CO (US)

( * ) Notice: Subject to any disclaimer, the term of this patent is extended or adjusted under 35 U.S.C. 154(b) by 659 days.

(21) Appl. No.: 16/210,318

(22) Filed: Dec. 5, 2018

(65) Prior Publication Data

US 2020/0184069 A1    Jun. 11, 2020

(51) Int. Cl.
| | | |
|---|---|---|
| *G06F 21/54* | (2013.01) | |
| *G06F 21/55* | (2013.01) | |
| *G06F 21/56* | (2013.01) | |
| *G06F 9/54* | (2006.01) | |

(52) U.S. Cl.
CPC .............. *G06F 21/54* (2013.01); *G06F 9/546* (2013.01); *G06F 21/552* (2013.01); *G06F 21/554* (2013.01); *G06F 21/566* (2013.01); *G06F 2209/542* (2013.01)

(58) Field of Classification Search
CPC ...... G06F 21/54; G06F 21/554; G06F 21/566; G06F 9/546; G06F 21/552; G06F 2209/542
See application file for complete search history.

(56) References Cited

U.S. PATENT DOCUMENTS

| | | | | |
|---|---|---|---|---|
| 7,797,702 | B1* | 9/2010 | Ferrie | G06F 21/52 718/101 |
| 2014/0380468 | A1* | 12/2014 | Gerzon | G06F 21/52 726/22 |
| 2015/0161396 | A1* | 6/2015 | Hentunen | G06F 21/54 726/25 |
| 2015/0215335 | A1* | 7/2015 | Giuliani | G06F 21/554 726/23 |
| 2016/0034687 | A1* | 2/2016 | Rhee | G06F 21/554 726/23 |
| 2016/0092673 | A1* | 3/2016 | LeMay | G06F 21/52 718/1 |
| 2016/0110542 | A1* | 4/2016 | Shanbhogue | G06F 21/52 726/23 |

(Continued)

OTHER PUBLICATIONS

Moula et al., ROPK++:An Enhanced ROP Attack Detection Framework for Linux Operating System, Jun. 2017, International Conference on Cyber Security And Protection Of Digital Services, pp. 1-6 (Year: 2017).*

*Primary Examiner* — Kenneth W Chang
(74) *Attorney, Agent, or Firm* — Sprinkle IP Law Group

(57) ABSTRACT

Examples of the present disclosure describe systems and methods for detecting and mitigating stack pivoting using stack artifact verification. In aspects, function hooks may be added to one or more functions. When a hooked function executes, artifacts relating to the hooked function may be left on the stack memory ("stack"). The location of the artifacts on the stack may be stored in a local storage area. Each time a hook in a hooked function is subsequently executed, protection may be executed to determine whether an artifact remains in the location stored in the local storage area. If the artifact is no longer in the same location, a stack pivot may be detected and one or more remedial actions may be automatically performed.

20 Claims, 4 Drawing Sheets

(56) References Cited

U.S. PATENT DOCUMENTS

2016/0196428 A1\* 7/2016 Momot ................ G06F 21/554
                                                                    726/23
2018/0039776 A1\* 2/2018 Loman ................. G06F 21/566

\* cited by examiner

DETECTING STACK PIVOTS USING STACK ARTIFACT VERIFICATION

BACKGROUND

Various forms of computer exploits utilize vulnerabilities in operating system and application code to enable attackers to gain control of process execution. As a specific example, the exploitation technique stack pivoting enables attackers to bypass hardware protections, or to chain Return-Oriented Programming (ROP) devices by tricking the victim computer into using fake stack memory controlled by the attacker. In many instances, such exploits are undetectable to exploit prevention software.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for detecting and mitigating stack pivoting using stack artifact verification. In aspects, function hooks may be added to one or more functions. When a hooked function executes, artifacts relating to the hooked function may be left on the stack memory ("stack"). The memory location of the artifacts on the stack may be stored in a local storage area. Each time a function hook is subsequently executed, protection may be executed to determine whether an artifact remains in the memory location stored in the local storage area. If the artifact is no longer in the same memory location, a stack pivot may be detected and one or more remedial actions may be automatically performed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
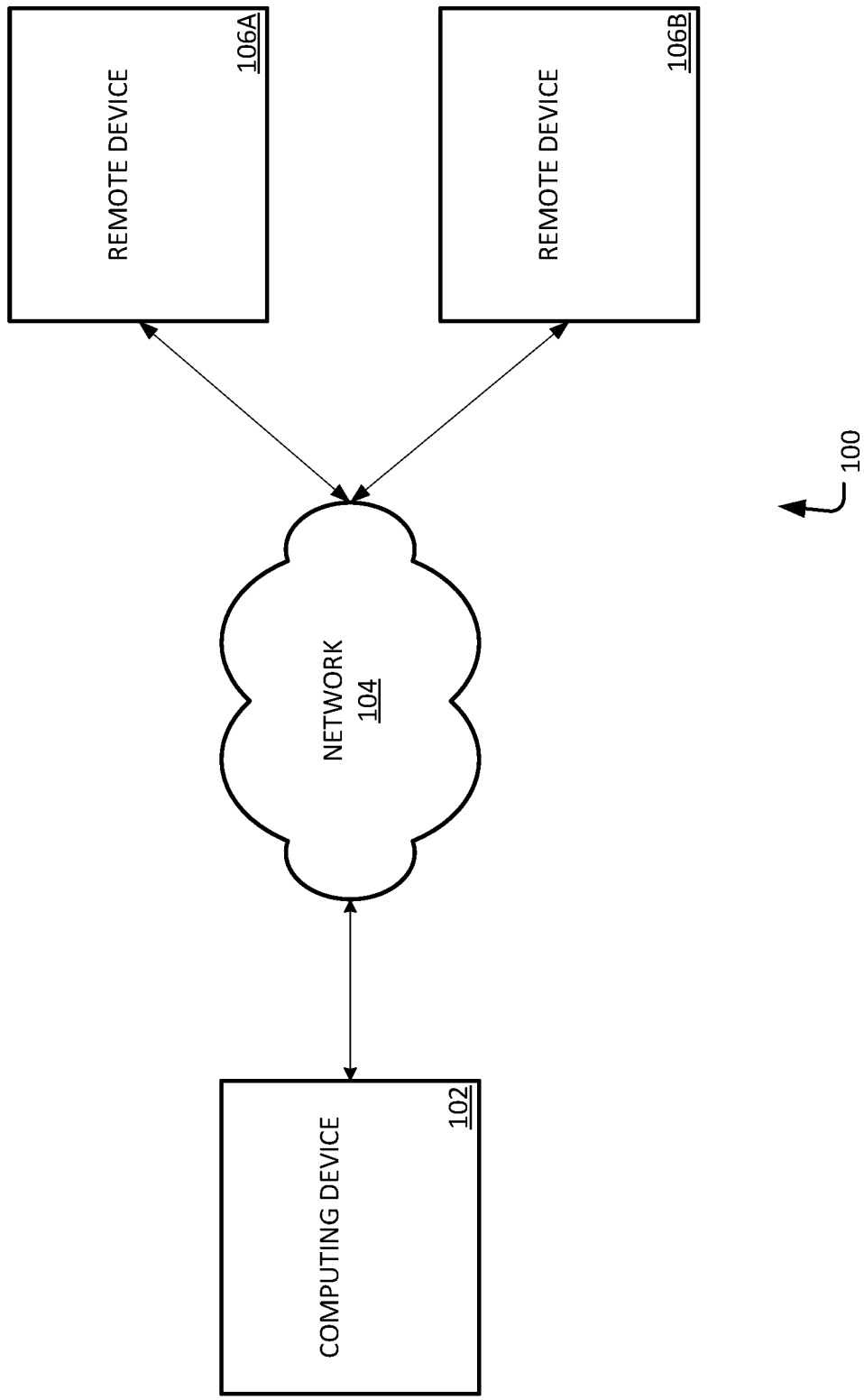
FIG. 1 illustrates an overview of an example system for detecting and mitigating stack pivoting exploits using stack artifact verification as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

With respect to the realm of computing, the stack is a memory region used for storing active subroutine information, such as return addresses and local variables. Stack pivoting is an exploitation technique that bypasses various computer security defenses using return-oriented programming (ROP). ROP enables attackers to reuse existing instructions in computer memory to perform malicious actions. After gaining control of the call stack, the attacker is able to execute a selection of instruction sequences (e.g., gadgets). Each gadget typically ends with a return instruction and is located within the current process or a shared library. Gadgets may be chained together to, for example, make executable memory for shellcode of the next stage of an exploit.

To address such exploits, the present disclosure describes systems and methods for detecting and mitigating stack pivoting using stack artifact verification. In aspects, function hooks may be added to one or more software code checkpoints. A function hook, as used herein, may refer to a set of instructions for intercepting function calls, messages, and/or events that are passed between software components. The checkpoints may include user mode checkpoints and/or kernel mode checkpoints. Examples of checkpoints may include process creation notification, thread creation notification, library file load (image load) notification, registry access callbacks, file system access callbacks, object manager callbacks (process and thread handle opening, duplication, etc.), virtual memory operation checks from user-mode hooks, user-mode hooks for endpoint protection, etc.

In aspects, when a function hook is executed, the operating system in which the function hook is executed may cause one or more artifacts of the execution to be placed on the stack. An artifact, as used herein, may refer to a return address for a routine or procedure. In some aspects, the function hook identifies the location of an artifact on the stack, and causes the location information of the artifact to be stored. In one example, the location information of the artifact may be stored using thread-local storage (TLS). TLS, as used herein, may refer to a method in which the threads of a multi-threaded process may allocate locations to store thread-specific data. When the function hook is subsequently executed, the current location of the artifact on the stack may be determined. If the current location of the artifact is not found on the stack (e.g., the artifact has been removed from the stack), remedial action may be performed. Alternatively, if the current location of the artifact is found on the stack, the current location may be compared to the previously stored location of the artifact. If the comparison reveals that the current location and the previous location are not the same, remedial action may be performed. Examples of remedial actions may include generating and displaying warnings and/or notifications, terminating one or more processes, modifying a set of permissions or privilege levels, quarantining one or more files, initiating (locally or remotely) anti-exploit software/services, etc.

Accordingly, the present disclosure provides a plurality of technical benefits including but not limited to: increasing computing environment security by preventing attackers from gaining unauthorized control of a device, detecting previously undetectable malware, evaluating process integrity over numerous checkpoints during (and prior to) process execution, performing automatic corrective action when exploits are detected or suspected, among other examples.

FIG. 1 illustrates an overview of an example system for detecting and mitigating stack pivoting exploits using stack artifact verification, as described herein. Example system 100 presented is a combination of interdependent components that interact to form an integrated whole for monitoring the security privileges of a process. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an example system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the example operating environments depicted in FIG. 4. In other examples, the components of systems disclosed herein may be spread across multiple devices. For instance, input may be entered or detected on a client device and information may be processed or accessed from other devices in a network, such as one or more server devices.

As one example, the system 100 comprises computing device 102, network 104, and remote devices 106A and 106B. One of skill in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, computing device 102 may incorporate or have access to exploit prevention software. The exploit prevention software may be located on, and accessed locally by, computing device 102. Alternately, the exploit prevention software may be located one or more of remote devices 106A and 106B, and accessible by computing device 102 via network 104. Examples of computing device 102 and remote devices 106A and 106B may include client devices (e.g., a user's laptop or PC, mobile device, wearable device, etc.), server devices, web-based appliances, or the like. The exploit prevention software may be configured to provide multi-vector protection and threat intelligence services for endpoints and networks by detecting, monitoring, preventing, and/or mitigating malware attacks and suspected threats. In examples, the exploit prevention software may identify, or facilitate the identification of, one or more software code and/or process execution checkpoints. Examples of checkpoints may include process creation events, thread creation events, library file load (image load) events, registry access events, file system access events, object manager events (process and thread handle opening, duplication, etc.), virtual memory operation checks from user-mode hooks, user-mode hooks for endpoint protection, etc. The exploit prevention software may facilitate (or otherwise enable) the use of function hooks at one or more checkpoints in software code accessible to computing device 102.

In some aspects, when a function hook is executed by a process, the operating system of computing device 102 may cause one or more artifacts of the execution to be placed on the stack associated with a thread of the process. The function hook may identify the location of an artifact on the stack, and causes the location information of the artifact to be stored. When the process subsequently causes any function hook to be executed again, the current stack may be evaluated to determine whether a current location of the previously identified artifact is present. If the current location of the previously identified artifact is determined to be absent from the stack, the exploit prevention software may determine that unauthorized or malicious behavior has occurred. Alternatively, if the current location of the previously identified artifact is determined to be present on the stack, the current location may be compared to the stored location of the previously identified artifact. If the comparison reveals that the current location and the previous location of the artifact are not the same, the exploit prevention software may determine that unauthorized or malicious behavior has occurred. Based on the determination, the exploit prevention software may cause one or more remedial actions to be performed. For example, the exploit prevention software may cause computing device 102 to display a warning on a user interface, terminate an executing process, or restrict access to one or more components of computing device 102. Additionally, the exploit prevention software may cause one or more remote devices, such as remote devices 106A and 106B, to install anti-exploit software/services on, or apply anti-exploit software/services to, computing device 102.

Figure 2:
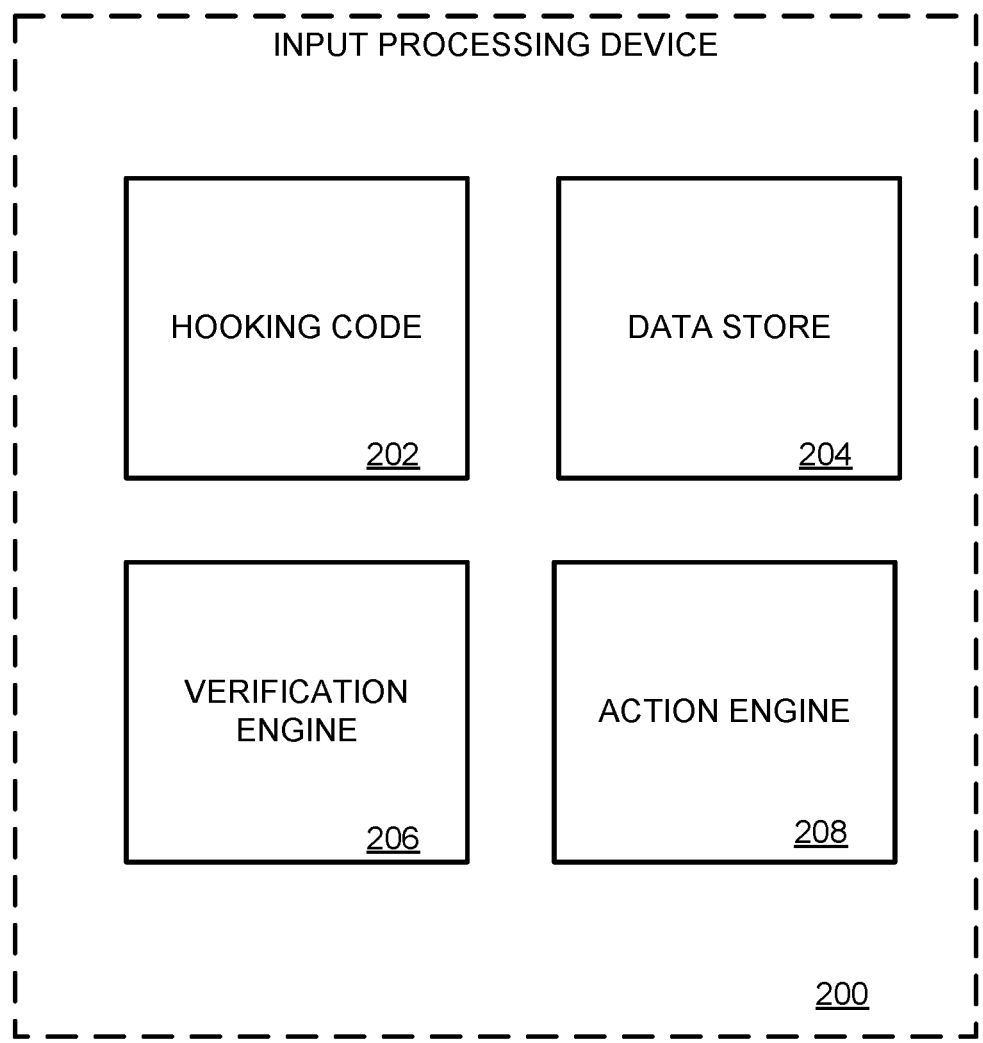
FIG. 2 illustrates an exemplary input processing system for detecting and mitigating stack pivoting exploits using stack artifact verification as described herein.

FIG. 2 illustrates an overview of an exemplary input device 200 for detecting and mitigating stack pivoting exploits using stack artifact verification, as described herein. The exploit prevention techniques implemented by input processing device 200 may comprise the processing techniques and content described in FIG. 1. In alternative examples, a distributed system (comprising one or more components such as processor and/or memory) may perform the processing performed by input device 200.

With respect to FIG. 2, input processing device 200 may comprise hooking code 202, data store 204, verification engine 206, and action engine 208. In aspects, input processing device 200 may be configured to execute one or more applications and/or APIs. Hooking may be used to insert function hooks, such as hooking code 202, at various positions ("checkpoints") in the applications and/or APIs. Hooking code 202 may be configured to intercept function calls, messages, and/or events that are passed between software components. The intercepted data may be used to debug, extend functionality, or collect information for the applications and/or APIs. As a specific example, hooking code 202 may be inserted into a thread initialization function in the operating system of input processing device 200. When a new thread is created by an executing process, the thread initialization function may be called. As part of the thread creation, the operating system may cause one or more artifacts, such as return address of a calling procedure/ function, to be left on a stack associated with the process. When the thread initialization function is called, hooking code 202 may identify the location on the stack of the artifact(s) caused by the thread creation. After identifying the location of the artifacts, hooking code 202 may store the location(s) in a storage location, such as data store 204.

Data store 204 may be configured to store information from various sources. In aspects, data store 204 may store information in unstructured, semi-structured, and/or structured formats. Although data store 204 is described in FIG. 2 as located locally to input processing device 200, it is contemplated that data store 204 may be located remotely to input processing device 200. It is further contemplated that one or more portions of the information identified and/or collected by hooking code 202 may be distributed across multiple data stores. In examples, data store 204 may provide APIS and search utilities for navigating or extracting the stored information. In some aspects, data store 204 may refer to a thread local storage (TLS) or a data source, such as a thread information block, a process environment block, or the like. Such sources may be data structures storing information related to the currently executing thread and/or process. The information may include, for example, process/thread identifier, current stack pointer, startup parameters, operating system variables, etc. Data store 204 may be accessible to various components of input processing device 200.

Verification engine 206 may be configured to determine whether the location of an artifact on the stack has changed. In aspects, when hooking code 202 is subsequently executed by the thread created above, verification engine 206 may evaluate the stack to determine whether the artifact is currently on the stack. If the artifact is determined to be on the stack, the verification engine 206 may compare the current location of the artifact with the location previously stored in data store 204. The comparison may include using one or more evaluation mechanisms to apply one or more rule sets, models and/or algorithms to the current and previously stored artifact locations. A model, as used herein, may refer to a predictive or statistical machine learning component that may be used to determine a probability distribution over one or more character sequences, classes, objects, result sets or events, and/or to predict a response value from one or more predictors. A model may be based on one or more rule sets, machine learning, a neural network, or the like. Based on the comparison, or determining that the artifact is not on the stack, verification engine 206 cause the performance of one or more remedial actions.

Action engine 208 may be configured to perform one or more actions. In aspects, action engine 208 may receive (or have access to) comparison data generated by verification engine 206. Action engine 208 may evaluate the output to determine whether an exploit or other anomalous behavior has been indicated. If an exploit/anomalous behavior has been detected, action engine 208 may perform (or cause the performance of) one or more remedial actions. Examples of remedial actions may include generating and displaying warnings and/or notifications, terminating one or more processes, modifying a set of permissions or privilege levels, quarantining one or more files, initiating (locally or remotely) anti-exploit software/services, etc. In at least one aspect, a warning or notification may be selectively dismissible by a user. Dismissing the warning/notification may enable the process causing the warning/notification to continue executing. If a warning or notification is ignored by a user or not responded to within a time limit, action engine 208 may automatically terminate the associated process.

Figure 3:
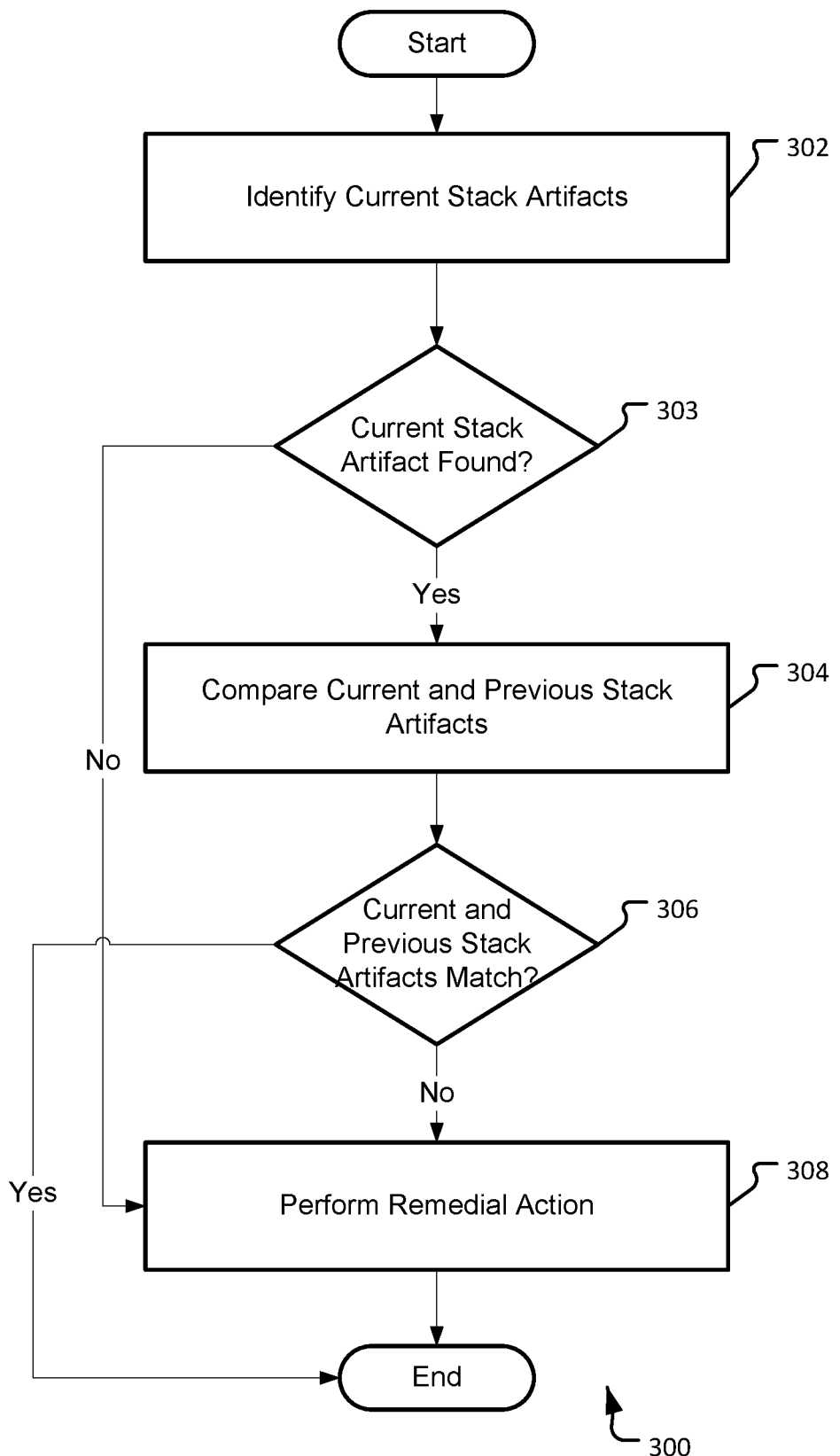
FIG. 3 illustrates an example method for detecting and mitigating stack pivoting exploits using stack artifact verification as described herein.

FIG. 3 illustrate example methods for detecting and mitigating stack pivoting exploits using stack artifact verification, as described herein. In aspects, method 300 may be executed by an exemplary system, such as system 100 of FIG. 1. Alternately, method 300 may be executed on a device comprising at least one processor configured to store and execute operations, programs or instructions, such as input processing device 200 of FIG. 2. However, method 300 is not limited to such examples. In other examples, method 300 may be performed by a remote application or service. In yet other examples, method 300 may be executed (e.g., computer-implemented operations) by one or more components of a distributed network, such as a web service or distributed network service (e.g. cloud service).

Example method 300 describes a computing device having access to one or more sets of executable instructions (e.g., applications, programs, APIs, etc.). In aspects, hooking functionality, such as hooking code 202, may be added to one or more software checkpoints of executable instructions in an operating system. The hooking functionality may be configured to intercept function calls and messages passed between software components for the purpose of debugging, extending functionality, or collecting information relating to the execution of the executable instructions. As a particular example, hooking functionality may be inserted into an operating system's internal thread initialization functions, BaseThreadInitThunk( ) and RtlUserThreadStart( ). When a process of the operating system causes a new process thread to be created, the above thread initialization functions are executed. During the initialization of a new thread, the operating system causes an artifact, such as return address, of each of these functions to be added to a stack associated with the process. The hooking functionality may identify the location on the stack of the artifacts and store the locations in a storage location, such as data store 204.

Example 300 begins at operation 302 where current stack artifacts are identified. In aspects, when a process thread causes the execution of a function (or similar machine code) having hooking functionality, the hooking functionality may be executed. The hooking functionality may be configured to, among other things, identify the current location of a stack artifact associated with the thread. Identifying the current location of a stack artifact may comprise evaluating or searching the stack associated with the thread to determine a position or an address of the artifact. In some aspects, the current location of a stack artifact may not be identified. In such aspects, the stack artifact may have been removed from the stack or may not have been on the stack currently being evaluated.

At decision operator 303, a determination is made regarding whether a current stack artifact has been identified. In aspects, if it is determined that the stack artifact is not found on the current stack, flow proceeds to operation 308. However, if it is determined that the stack artifact is found on the current stack, flow proceeds to operation 304.

At operation 304, current and previous stack artifacts are compared. After the current location of the stack artifact has been identified, the current location of the stack artifact may be compared to the previous location of the stack artifact. In examples, the previous location of the stack artifact may be the location previously identified and stored during thread initialization. Comparing the current location and the previous location may comprise using one or more pattern matching utilities, such as verification engine 206, to determine whether the current location matches the previous location. For example, the return address previously identified on the stack for RtlUserThreadStart( ) and stored in TLS may be 0x0804839a. A regular expression utility may be used to determine whether the previous return address of the function matches the current return address of the function when a process thread executes hooking functionality associated with the function. In other examples, alternate pattern matching techniques may be used to determine whether a previous return addresses matches a current return address, such as matching hashes, scalar comparisons, etc.

At decision operation 306, a determination is made regarding whether the current return address matches the previous return address. In aspects, if it is determined that the current return address matches the previous return address, the process thread may be determined to be functioning as expected and the flow ends. However, if it is determined that the current return address does not match the previous return address, a stack pivot is detected and flow proceeds to operation 308. At operation 308, remedial action may be triggered. In aspects, upon detecting a stack pivot, a remediation component, such as action engine 208, may perform, recommend, or schedule remedial action. Examples of remedial actions may include generating and displaying warnings and/or notifications, terminating one or more processes, modifying a set of permissions or privilege levels, quarantining one or more files, initiating (locally or remotely) anti-exploit software/services, etc. As a specific example, a computing device may detect a stack pivot during process execution. As a result, the computing device may terminate the process thread and display a notification explaining the process thread termination. As another example, a remote service executing exploit prevention software may detect the stack pivot on a computing device. As a result, the remote service may suspend the process and generate a warning/notification to a user regarding the potential hazards of the exploit. Additionally, the remote service may provide a selectable control enabling a user to terminate the process or to ignore the warning/notification.

Figure 4:
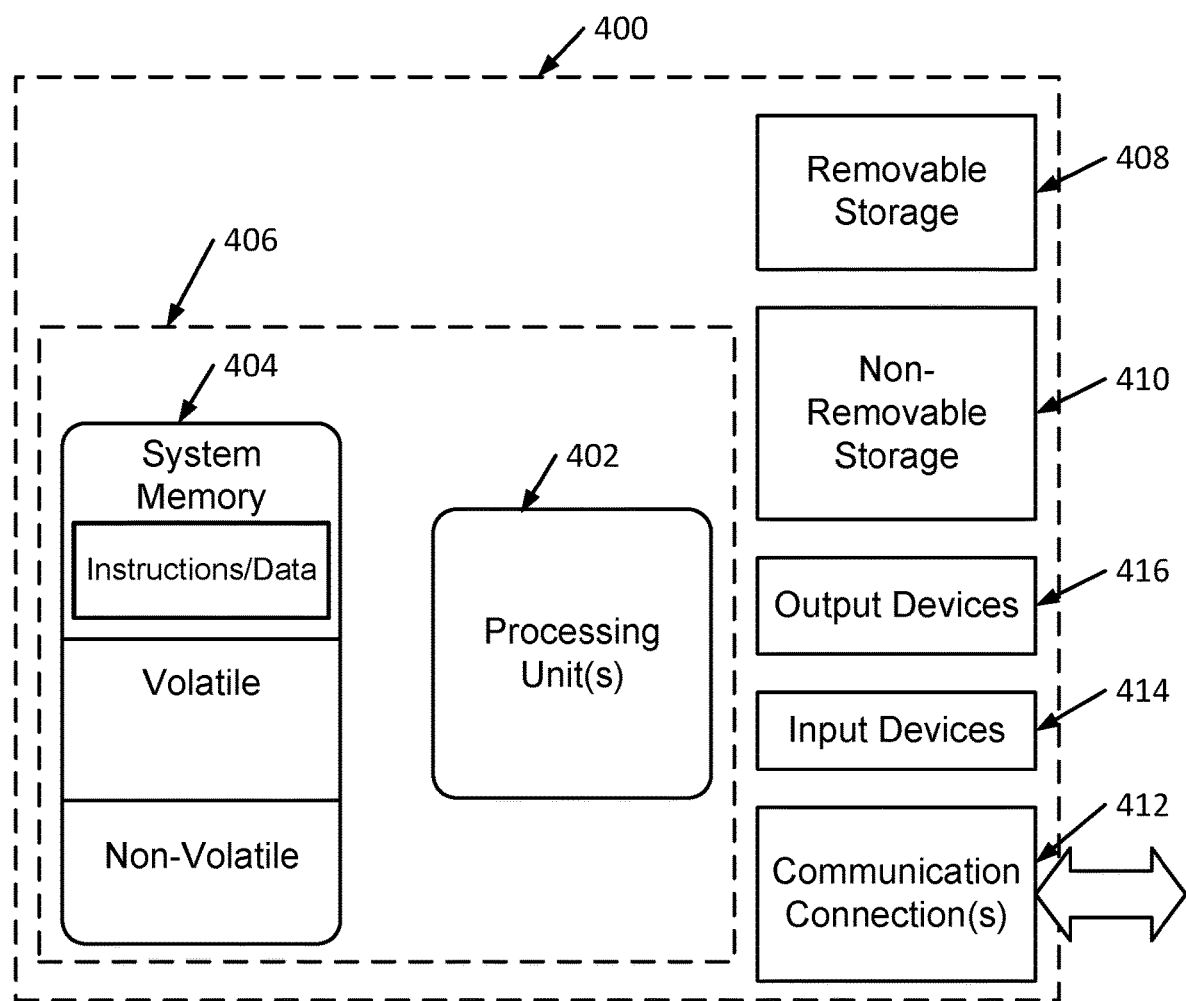
FIG. 4 illustrates one example of a suitable operating environment in which one or more of the present embodiments may be implemented.

FIG. 4 illustrates one example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically includes at least one processing unit 402 and memory 404. Depending on the exact configuration and type of computing device, memory 404 (storing, among other things, stack artifact information, anti-exploit code/data, instructions to perform the methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device (s) 414 such as keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs a method comprising:
   identifying a first location of an artifact in stack memory, wherein the stack memory comprises a plurality of different locations and the first location is one of the plurality of locations, and wherein the artifact is associated with a thread incorporating hooking functionality, and wherein the first location represents a current location of the artifact in stack memory;
   comparing the first location to a second location of that artifact on the stack memory, wherein the second location is one of the plurality of locations comprised by the stack memory and represents a previously identified location of that artifact in the stack memory;
   determining whether the first location matches the second location; and
   when it is determined that the first location does not match the second location, automatically performing one or more remedial actions.

2. The system of claim 1, wherein the artifact is added to the stack memory in response to initializing the thread.

3. The system of claim 1, wherein comparing the first location to the second location comprises accessing a data storage location comprising the second location.

4. The system of claim 1, wherein identifying the first location comprises evaluating the stack memory for the first location when the hooking functionality is executed.

5. The system of claim 1, wherein comparing the first location to the second location comprises evaluating the stack memory for the second location when the hooking functionality is executed.

6. The system of claim 1, wherein the hooking functionality is added to one or more checkpoints in software code, and wherein the hooking functionality enables intercepting messages passed between two or more components of the system.

7. The system of claim 1, wherein the artifact is associated with a thread creation function for creating the thread, wherein the thread creation function comprises the hooking functionality.

8. The system of claim 1, wherein the artifact corresponds to a return address of a calling function.

9. The system of claim 1, wherein comparing the first location to the second location comprises using one or more pattern matching utilities to determine whether the first location matches the second location.

10. The system of claim 1, wherein, when it is determined that the first location does not match the second location, determining that a stack pivot exploit has occurred.

11. The system of claim 1, wherein the one or more remedial actions comprise at least one of: displaying a warning, terminating a process, modifying a set of privileges, and quarantining a file associated with the process.

12. A method comprising:
    identifying a first location of an artifact in stack memory, wherein the stack memory comprises a plurality of different locations and the first location is one of the plurality of locations, and wherein the artifact is associated with a thread incorporating hooking functionality, and wherein the first location represents a current location of the artifact in stack memory;
    comparing the first location to a second location of that artifact on the stack memory, wherein the second location is one of the plurality of locations comprised by the stack memory and represents a previously identified location of that artifact in the stack memory;
    determining whether the first location matches the second location; and
    when it is determined that the first location does not match the second location, performing one or more remedial actions.

13. The method of claim 12, wherein comparing the first location to the second location comprises accessing thread-local storage (TLS) comprising the second location.

14. The method of claim 12, wherein the artifact identifies a return address of a calling function.

15. The method of claim 12, wherein the first location is a first position in the stack memory and the second location is a second position in the stack memory.

16. The method of claim 15, wherein the artifact is added to the stack memory in response to creating the thread, wherein creating the thread comprises executing one or more thread creation function having the hooking functionality.

17. The method of claim 12, wherein the one or more remedial actions comprise indicating a stack pivot exploit has occurred.

18. The method of claim 12, wherein, the remedial action comprises terminating the thread.

19. A non-transitory computer-readable media storing computer executable instructions that when executed cause a computing system to perform a method comprising:
    identifying, at a first time, a first location of an artifact in stack memory, wherein stack memory comprises a plurality of different locations and the first location is one of the plurality of locations, wherein the artifact is associated with a thread incorporating hooking functionality, and wherein the first location represents a previously identified location of the artifact in that stack memory;
    evaluating, at a second time, the stack memory, wherein the evaluation comprises determining the first location of the artifact is not currently found in the stack memory; and
    based on determining the first location is no longer found in the stack memory, performing one or more remedial actions.

20. The non-transitory computer-readable media of claim 19, wherein the first location is a first return address of a function.

* * * * *